(12) United States Patent
Nill

(10) Patent No.: US 11,209,042 B2
(45) Date of Patent: Dec. 28, 2021

(54) PIVOT FITTING AND PIECE OF FURNITURE

(71) Applicant: HETTICH FRANKE GMBH & CO. KG, Balingen-Weilstetten (DE)

(72) Inventor: Oliver Nill, Hechingen (DE)

(73) Assignee: HETTICH FRANKE GMBH & CO. KG, Balingen-Weilstetten (DE)

( * ) Notice: Subject to any disclaimer, the term of this patent is extended or adjusted under 35 U.S.C. 154(b) by 72 days.

(21) Appl. No.: 16/612,189

(22) PCT Filed: May 7, 2018

(86) PCT No.: PCT/EP2018/061681
§ 371 (c)(1),
(2) Date: Nov. 8, 2019

(87) PCT Pub. No.: WO2018/206485
PCT Pub. Date: Nov. 15, 2018

(65) Prior Publication Data
US 2020/0208677 A1      Jul. 2, 2020

(30) Foreign Application Priority Data
May 11, 2017   (DE) ..................... 10 2017 110 249.3

(51) Int. Cl.
*F16C 11/04*     (2006.01)
*A47C 7/54*      (2006.01)

(52) U.S. Cl.
CPC ............. *F16C 11/04* (2013.01); *A47C 7/541* (2018.08)

(58) Field of Classification Search
CPC ...... A47C 1/026; A47C 1/0308; B60N 2/235; F16C 11/04
(Continued)

(56) References Cited

U.S. PATENT DOCUMENTS 6,926,363 B2 * 8/2005 Yamashita ............. A47C 1/026
                                                            16/321
7,090,299 B2    8/2006 Lange
(Continued)

FOREIGN PATENT DOCUMENTS

CN         1191950 C      3/2005
CN         1672979 A      9/2005
(Continued)

OTHER PUBLICATIONS

International Search Report dated Jun. 29, 2018 in related/corresponding International Application No. PCT/EP2018/061681.
(Continued)

*Primary Examiner* — Sarah B McPartlin
(74) *Attorney, Agent, or Firm* — Patent Portfolio Builders PLLC

(57) ABSTRACT

A pivot fitting for moveable furniture parts on pieces of furniture has a first lever and a second lever mounted so as to pivot relative to each other about a common pivot axis from a basic position through a predetermined angle in an adjusting direction and a resetting direction, a latching mechanism, with which the two levers can be latched at different angular positions within the predetermined angle relative to each other counter to a force acting in the resetting direction, the levers being pivotable in the resetting direction when the latching mechanism is deactivated. A force-transmission shaft of the adjusting mechanism is coupled to the second level in a rotationally fixed manner. The latching mechanism can be deactivated by pivoting the second lever relative to the first lever in the adjusting direction when an end position has been reached. A damping structural unit is arranged on the first lever to damp the pivot movement of the second lever relative to the first lever in the adjusting direction from a predetermined adjusting angle.

18 Claims, 18 Drawing Sheets

Figure 1:
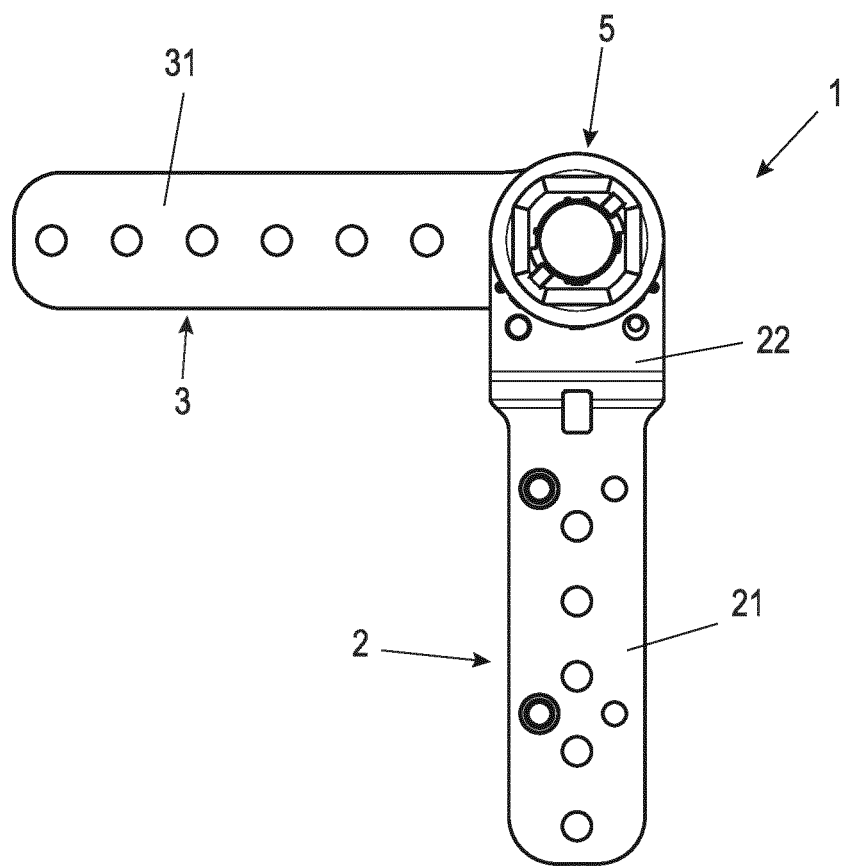

(58) Field of Classification Search
 USPC .................................................. 297/366, 367
 See application file for complete search history.

(56) References Cited

U.S. PATENT DOCUMENTS

| | | | |
|---|---|---|---|
| 8,156,612 B2* | 4/2012 | Yamashita | A47C 1/026 |
| | | | 16/354 |
| 9,683,397 B2 | 6/2017 | Buchholz | |
| 9,790,985 B2 | 10/2017 | Haug et al. | |
| 2009/0288270 A1* | 11/2009 | Yamashita | A47C 7/38 |
| | | | 16/239 |
| 2013/0011181 A1 | 1/2013 | Riedmueller | |
| 2016/0348713 A1* | 12/2016 | Haug | A47C 7/54 |

FOREIGN PATENT DOCUMENTS

| | | |
|---|---|---|
| DE | 202010000368 U1 | 8/2011 |
| DE | 202012100202 U1 | 4/2013 |
| DE | 102013104692 A1 | 11/2014 |
| DE | 102013108665 A1 | 2/2015 |
| DE | 102015113749 A1 | 2/2017 |
| EP | 2389839 A1 | 11/2011 |
| GB | 1042181 A | 9/1966 |
| JP | 2008259613 A | 10/2008 |
| RU | 2416350 C2 | 4/2011 |

OTHER PUBLICATIONS

Search Report created on Sep. 13, 2017 in related/corresponding DE Application No. 10 2017 110 249.3.
Written Opinion dated Jun. 29, 2018 in related/corresponding International Application No. PCT/EP2018/061681.
Search Report dated Aug. 18, 2021 in related/corresponding RU Application No. 2019136913.

\* cited by examiner

Fig. 17
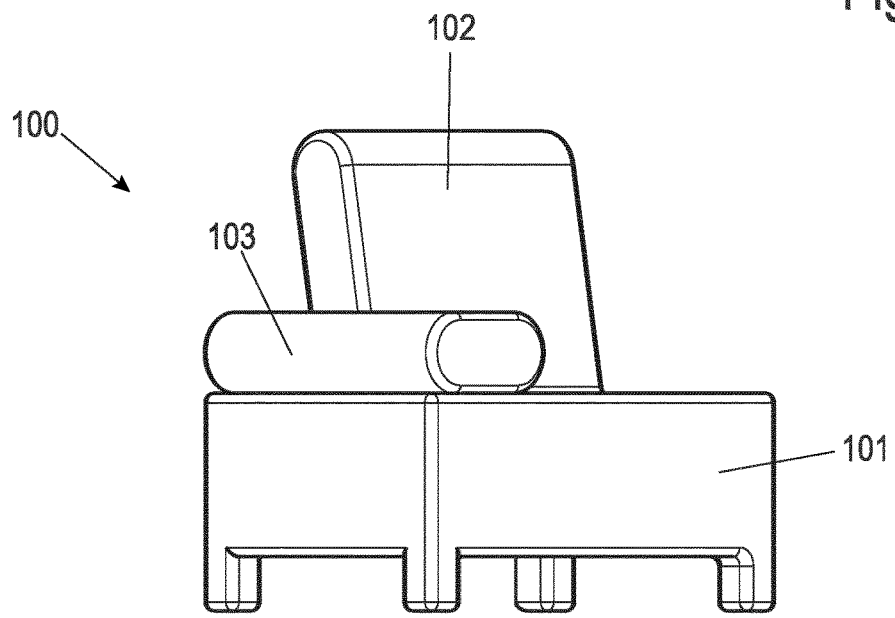
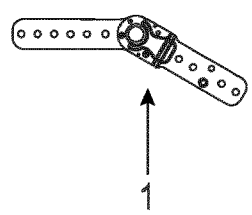
Fig. 18
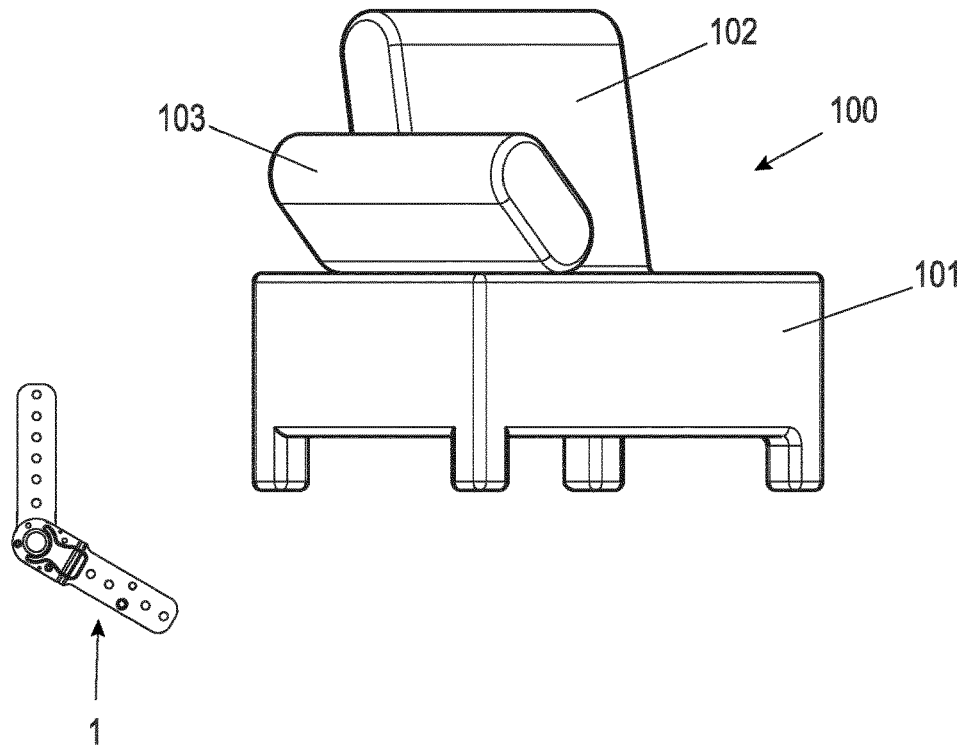

PIVOT FITTING AND PIECE OF FURNITURE

BACKGROUND AND SUMMARY OF THE INVENTION

Exemplary embodiments of the present invention relate to a pivot fitting, in particular for a movable furniture part on pieces of furniture, and also a piece of furniture.

Such pivot fittings are used, for example, for pivoting backrests, headrests, or armrests of a piece of seating or reclining furniture in relation to the furniture body of the piece of furniture. The pivot fitting is secured using a first lever on the furniture body in this case. A second lever of the pivot fitting is connected to the headrest or the armrest. With the aid of this pivot fitting, the backrest, headrest, or the armrest may be adjusted into various angular positions in relation to the furniture body.

Such pivot fittings have proven themselves in practice per se. It is disadvantageous that during the adjustment of the movable furniture part into a maximum possible last catch position, this is not recognizable using conventional pivot fittings and accordingly this last catch position is frequently overrun during the adjustment of the movable furniture part, which has the result that the user reaches the switchover position of the pivot fitting in this case, at which the catch mechanism is switched so it is inactive, so that the user has to pivot the pivot fitting back into the starting position and subsequently attempt again by pivoting in the adjustment direction to adjust the movable furniture part into the last possible catch position.

Exemplary embodiments of the present invention are directed to a pivot fitting and a piece of furniture that makes it easier to find a predetermined catch position.

The pivot fitting according to the invention comprises a first lever and a second lever, which are mounted so they are pivotable in relation to one another around a pivot axis out of a base position by a predetermined angle in an adjustment direction and a reset direction.

The pivot fitting furthermore comprises a catch mechanism, using which the two levers can be latched in different angular positions within the predetermined angle in relation to one another against a force acting in the reset direction and are pivotable in the reset direction when the catch mechanism is deactivated.

A force shaft of the adjustment mechanism is coupled in a rotationally-fixed manner to the second lever of the pivot fitting. The catch mechanism is deactivatable in this case by pivoting the second lever in relation to the first lever in the adjustment direction upon reaching a switchover position.

A damping unit is arranged on the first lever of the pivot fitting, which is used for damping the pivot movement of the second lever in relation to the first lever in the adjustment direction from a predetermined adjustment angle.

Such a pivot fitting enables, due to the arrangement of the damping unit, a predetermined catch position of the pivot fitting, in particular the last catch position before reaching the switchover position, to be found more easily. This is effectuated by increasing the required adjustment force that counteracts the damping unit from a predetermined adjustment angle, so that for the user of such a pivot fitting or a piece of furniture according to the invention having such a pivot fitting, the predetermined catch position is to be found in a simple manner due to the differing required application of force during the adjustment of the pivot fitting and thus an incorrect actuation in the sense of overrunning the predetermined catch position is to be avoided.

According to one embodiment variant of the invention, the damping unit comprises a first plate secured in a rotationally-fixed manner on a lever head of the first lever, and a second plate, which rests on the first plate and is rotatable around the pivot axis in relation to the first plate.

The damping unit furthermore comprises at least one damping element arranged between the plates and coupled to both plates and which counteracts a rotational movement of the second plate in relation to the first plate in the adjustment direction, and also a driver, which is rotatable with the second plate by the predetermined adjustment angle in relation thereto and is coupled in a rotationally-fixed manner to the force shaft.

Such a damping unit is distinguished by its simple structure. In addition, such a damping unit is attachable in a simple manner to pivot fittings of different designs.

According to a further advantageous embodiment variant, at least one receptacle pocket for the rotationally-fixed mounting of the at least one damping element is formed in the plates. The at least one damping element is mounted in this case in such a way that a pivot of the plates in relation to one another in the adjustment direction beyond the predetermined adjustment angle causes a force counteracting the pivot and is exerted by the at least one damping element.

This enables, in particular, a setting capability of the desired elevated force to be applied by inserting one or more damping elements and/or by damping elements having damping factors of different sizes.

According to a further embodiment variant, at least one receptacle pocket formed as a half shell is formed on each of the plates. The half shells of the plates form, in angular positions of the pivot fitting between a starting position and the predetermined adjustment angle when located axially one over the other, a receptacle chamber for the damping element, which is made smaller due to pivoting of the pivot fitting in the adjustment direction from the angular position corresponding to the predetermined adjustment angle in the direction of a switchover position of the pivot fitting by relative displacement of the receptacle pocket of the second plate in relation to the receptacle pocket of the first plate.

A compression of the damping element, preferably in the form of a spring, in particular a coiled spring, is thus effectuated.

In addition to the formation of the damping element as a spring, it is also conceivable to insert a block made of elastic material or a damping element of another design in the receptacle pockets.

According to one embodiment variant, at least one stop is formed on the second plate, wherein the driver is designed as a ring disk enclosing the force shaft having at least one tooth extending radially outward, which bears on the stop in an angular position of the pivot fitting corresponding to the adjustment angle.

This enables, in a simple manner, a rotational movement of the second plate in relation to the first plate after reaching the adjustment angle, during which the driver presses against the stop of the second plate.

According to one embodiment variant, at least one anchoring web inserted into an anchoring receptacle of the first lever is formed on the first plate for the rotationally-fixed fixation of the first plate on the first lever, which enables a simple rotationally-fixed installation of the first plate on the first lever.

According to one embodiment variant, the damping unit comprises a central bolt, using which the damping unit is fixed on the first lever and/or on the second lever axially in relation to the pivot axis.

Lifting of the second plate off of the first plate during pivoting of the plates in relation to one another is thus prevented.

The plates can be formed as plastic components according to one embodiment variant. According to a further embodiment variant, the plates can also be formed as steel components.

BRIEF DESCRIPTION OF THE DRAWING FIGURES

Figure 2:
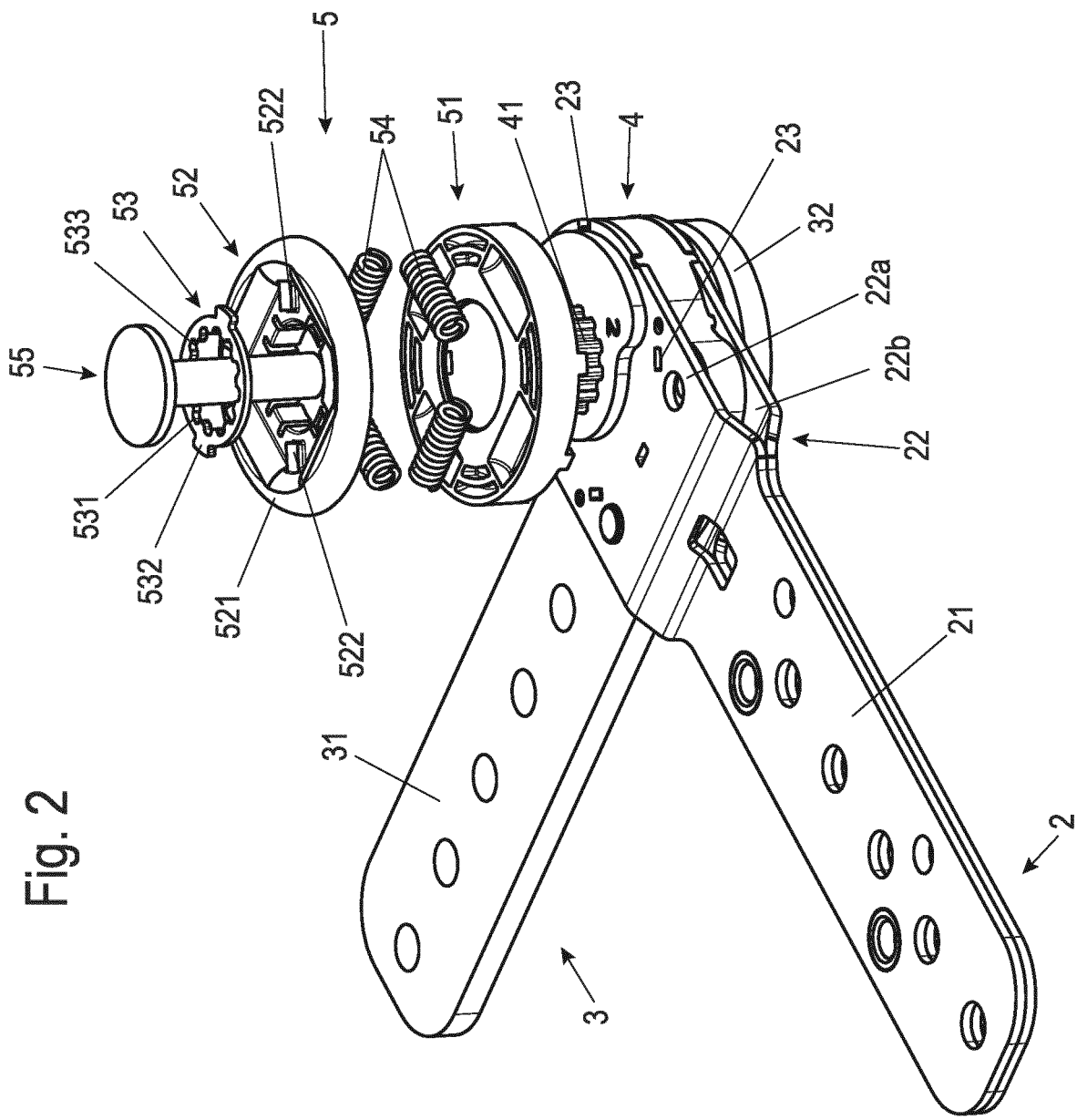
Figure 3:
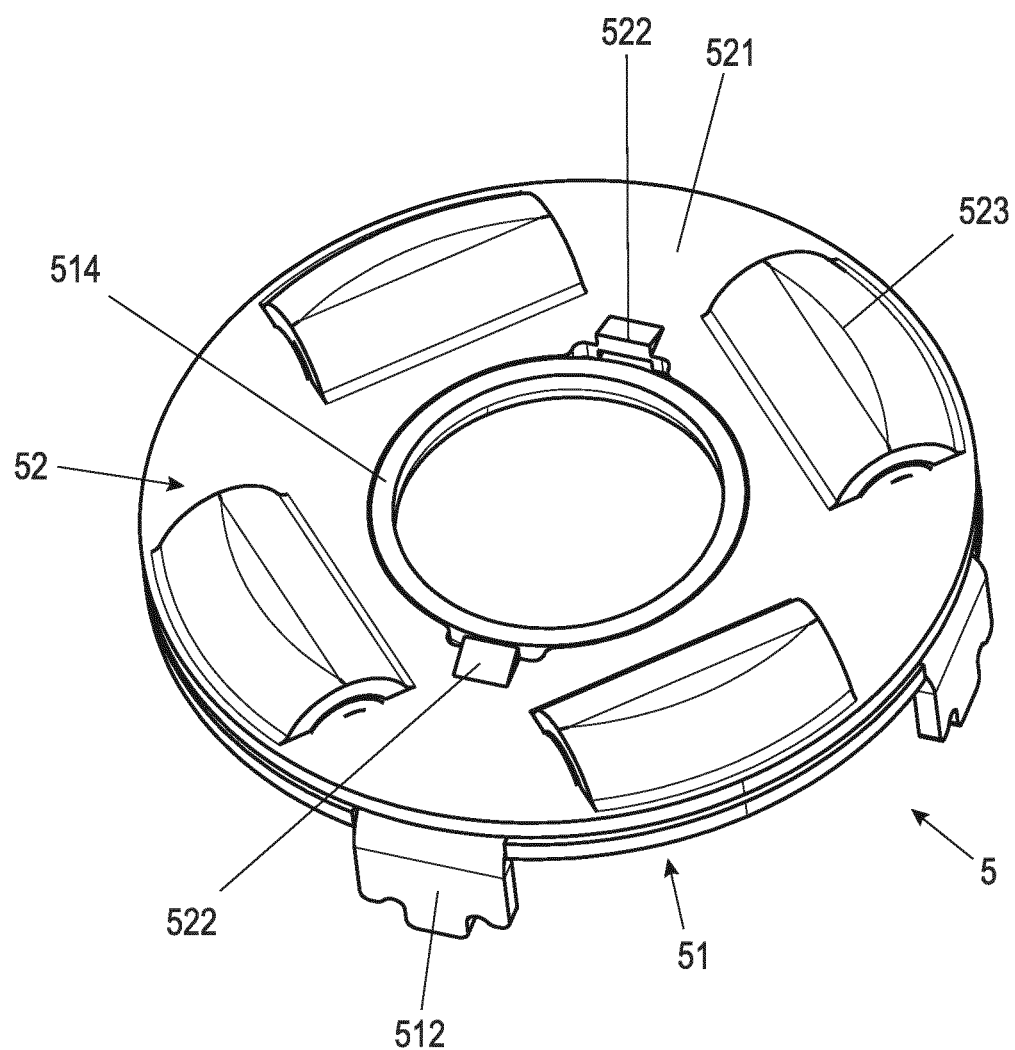
Figure 4:
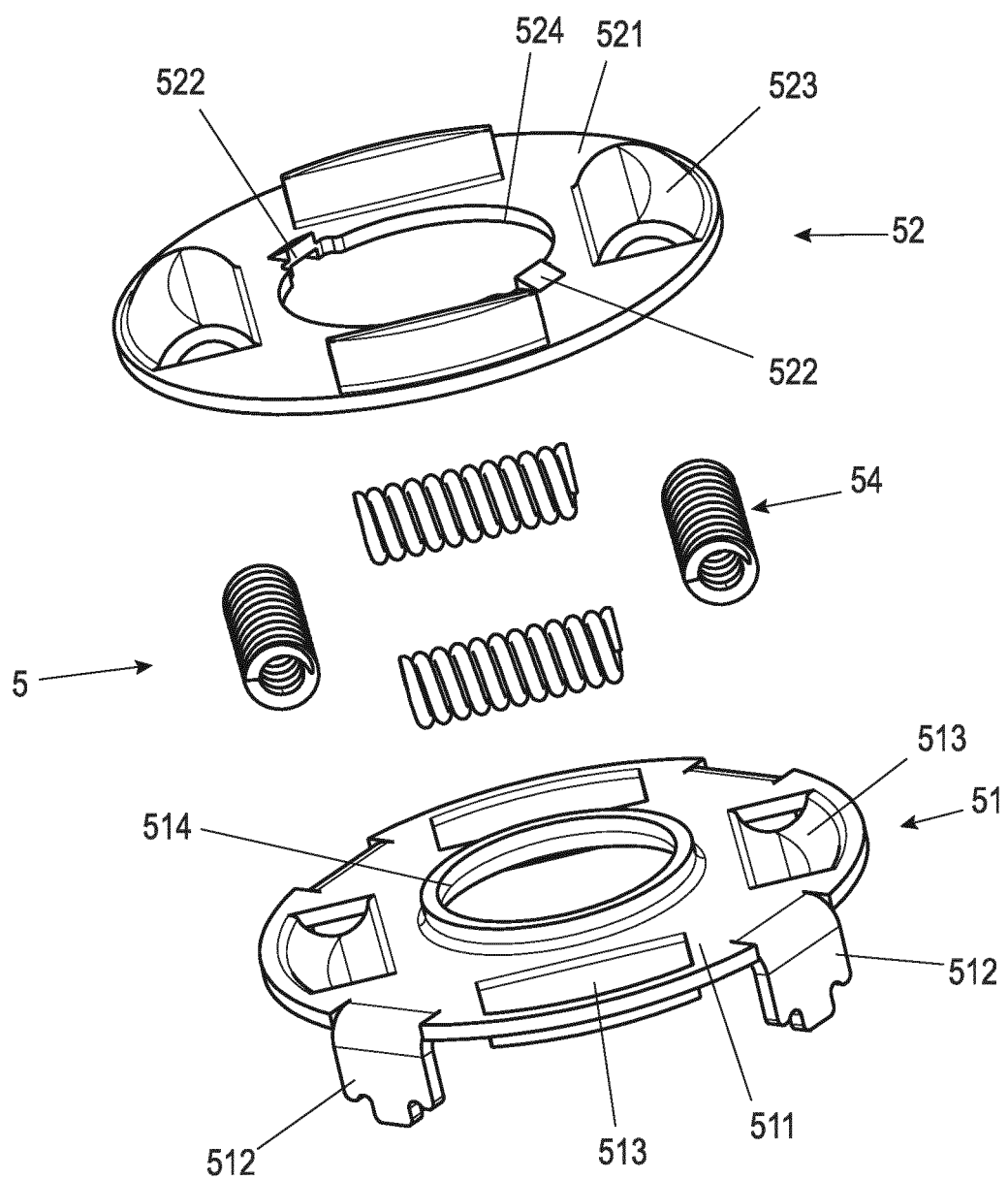
Figure 5:
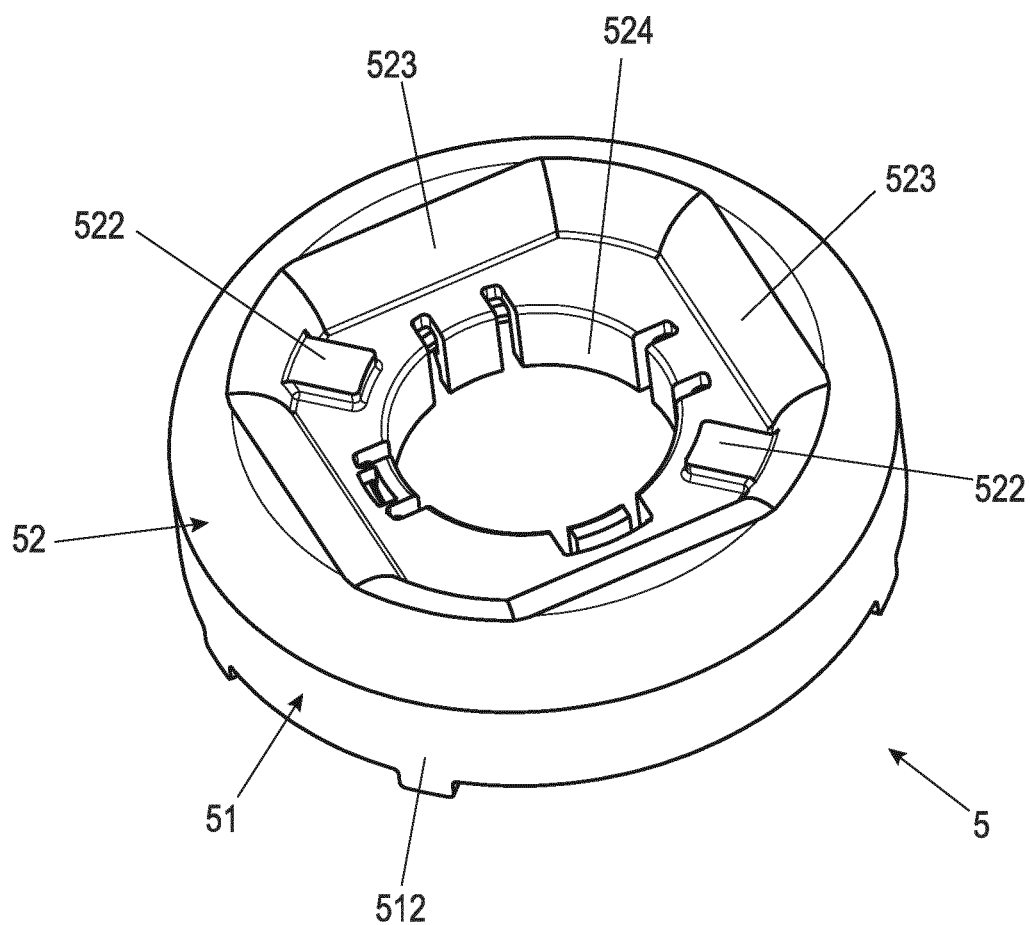
Figure 6:
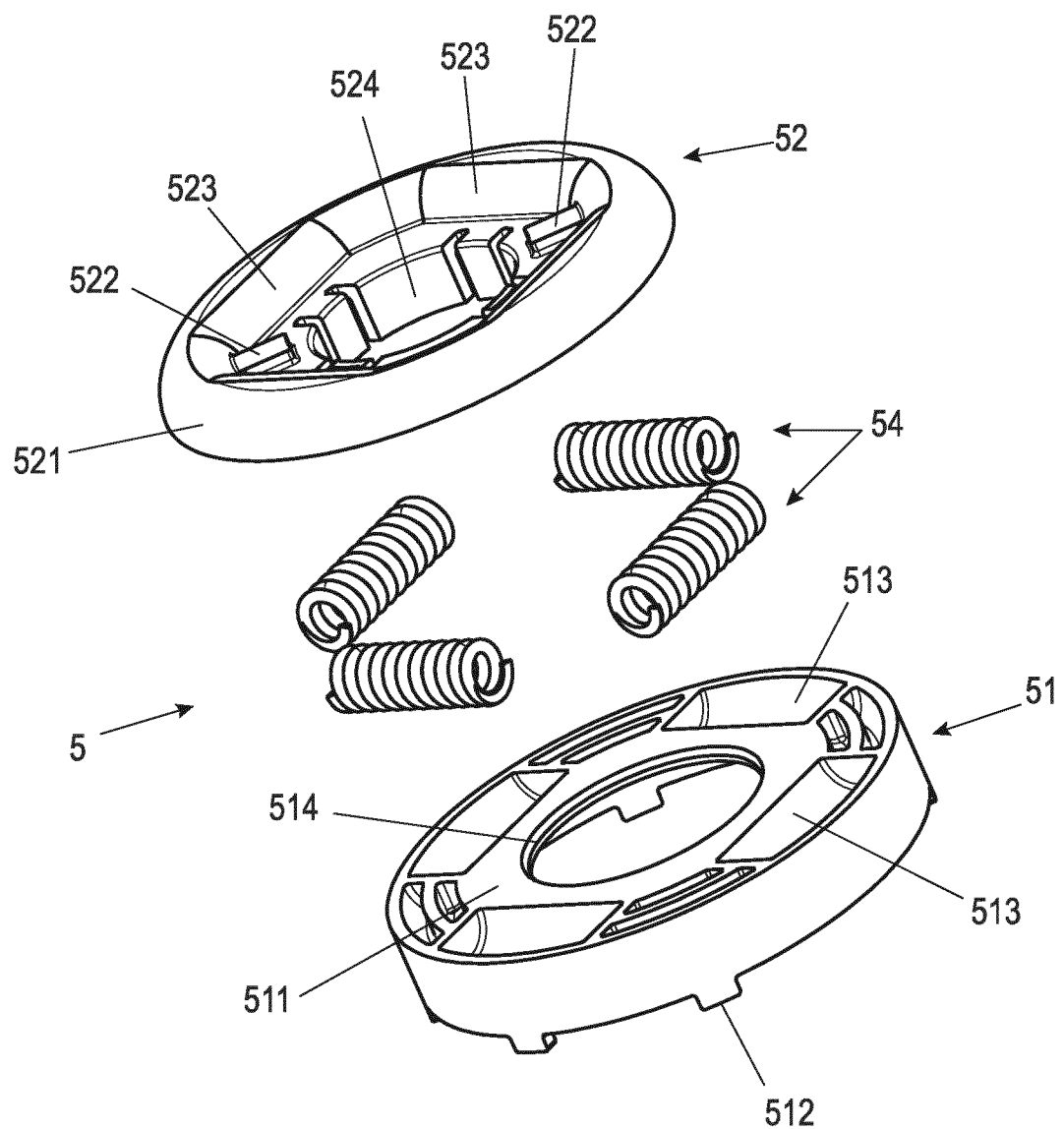
Figure 7:
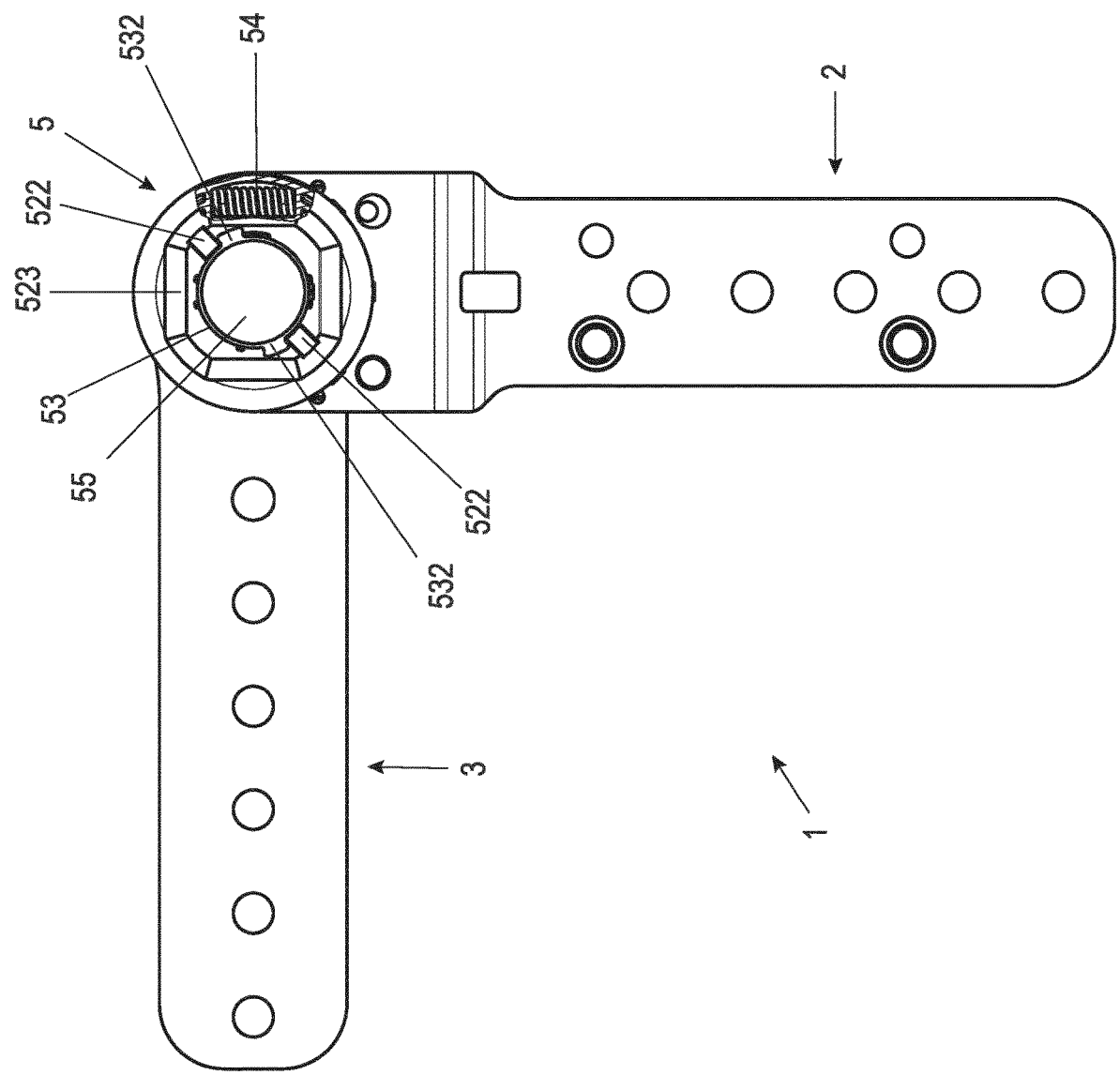
Figure 8:
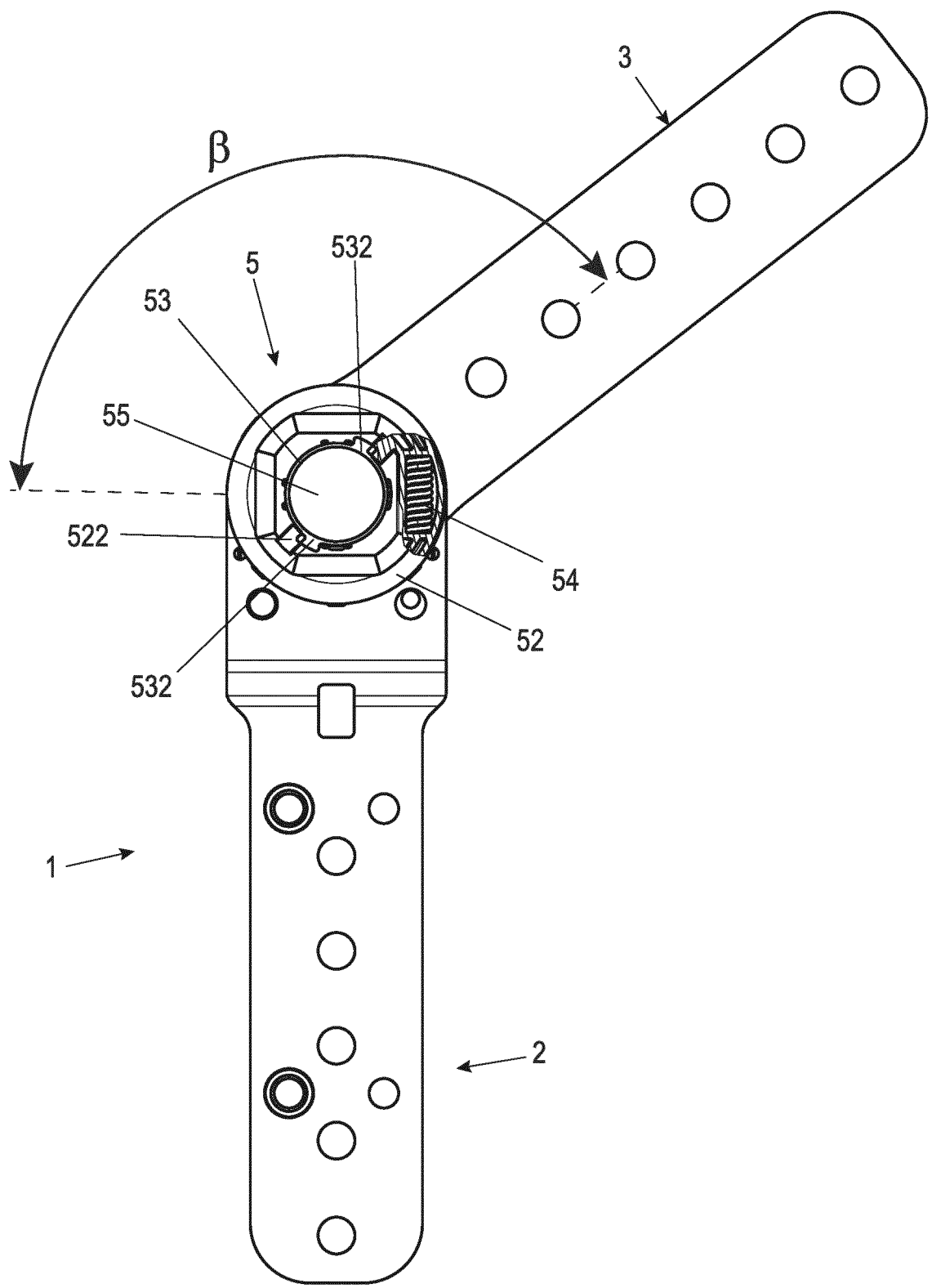
Figure 9:
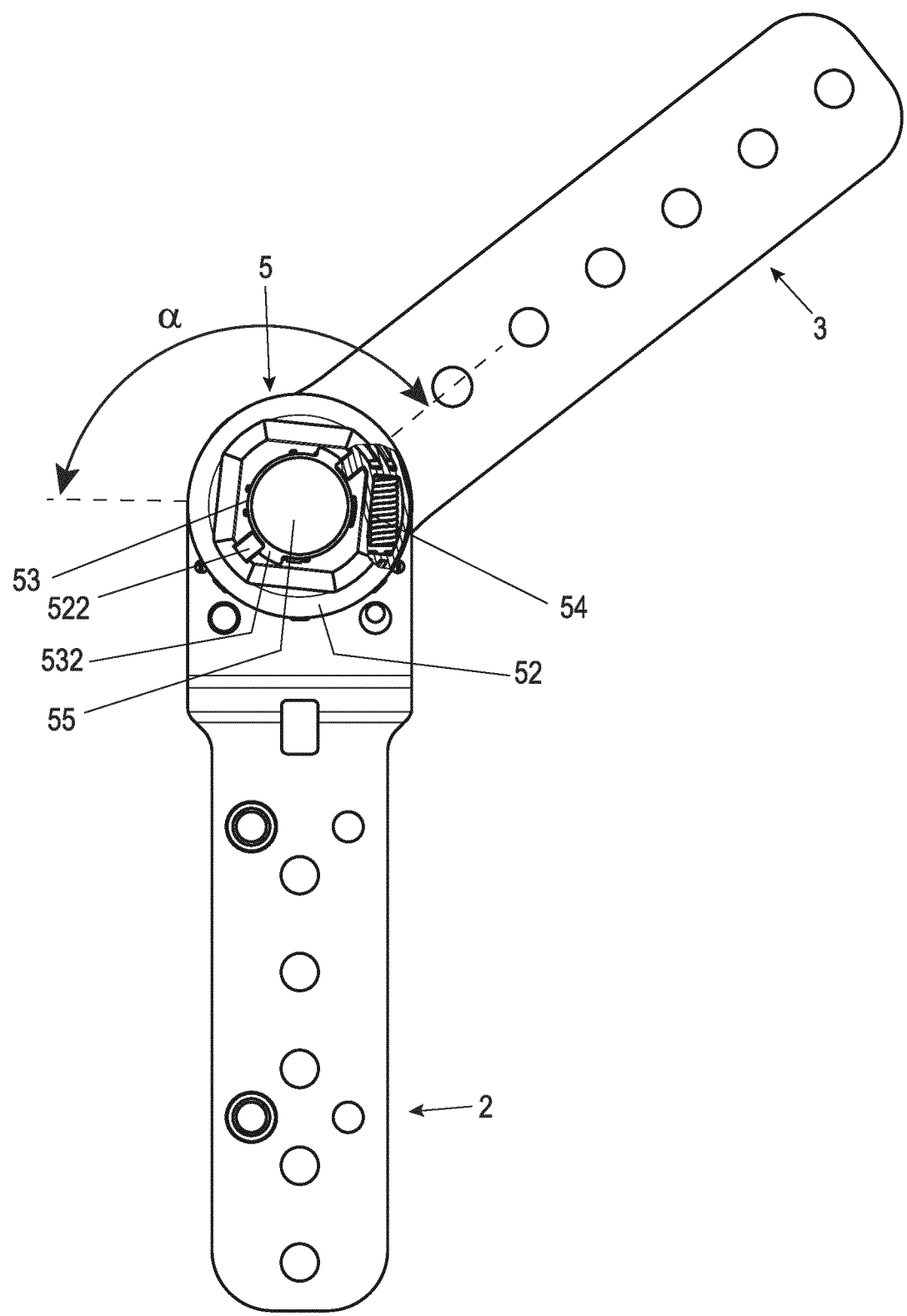
Figure 10:
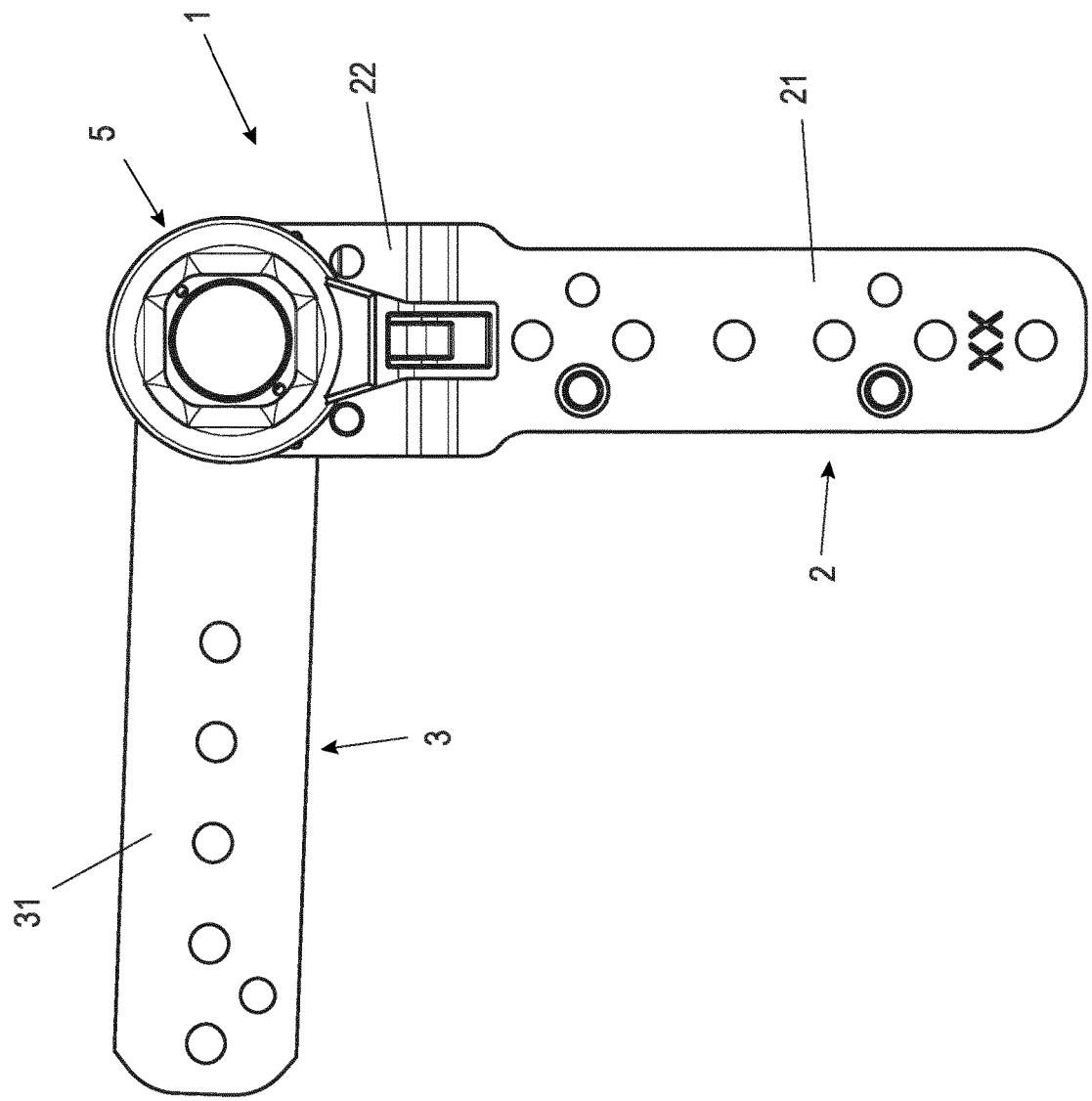
Figure 11:
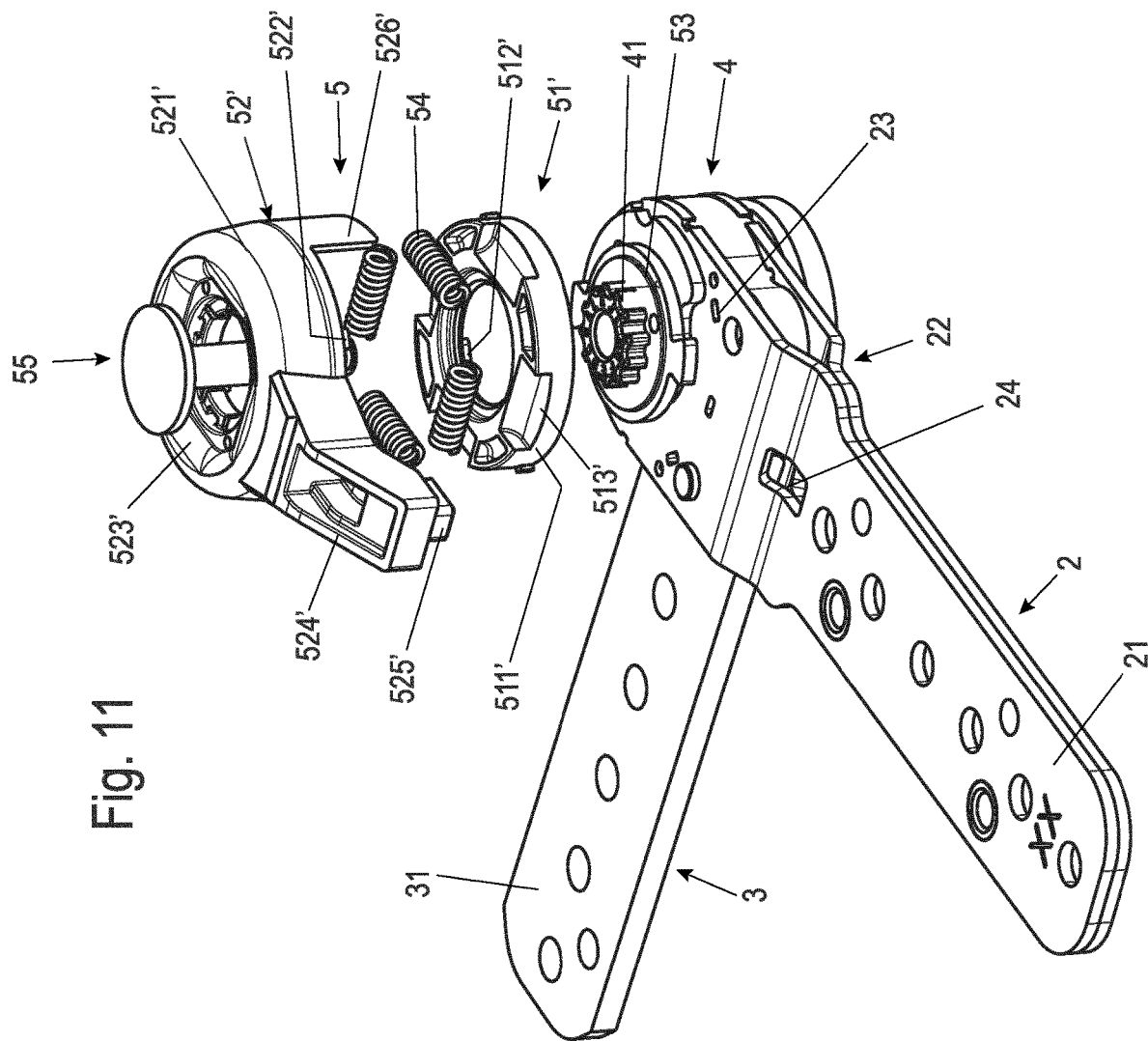
Figure 12:
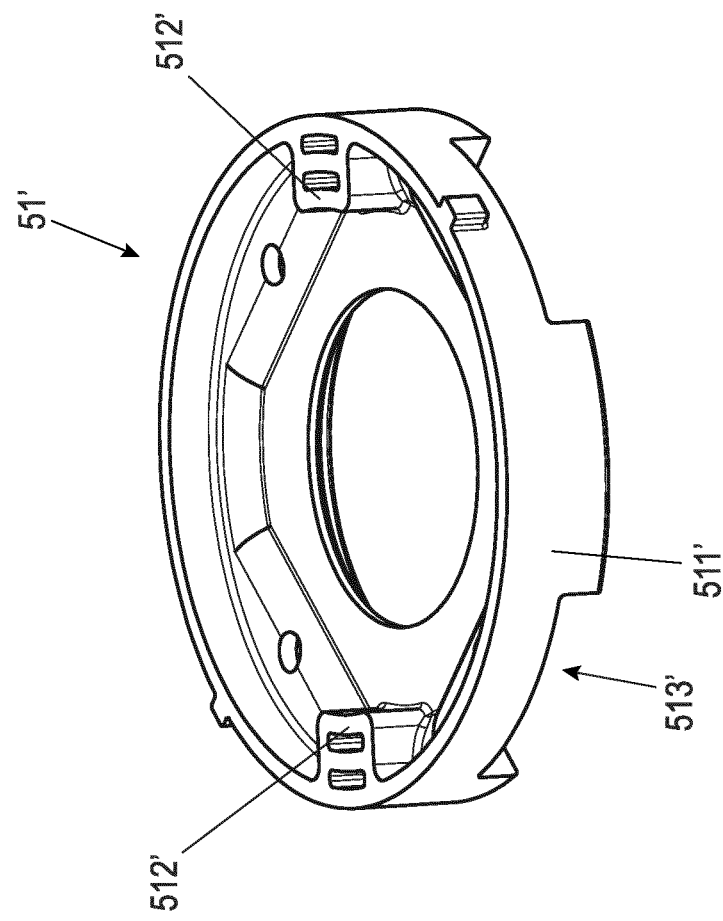
Figure 13:
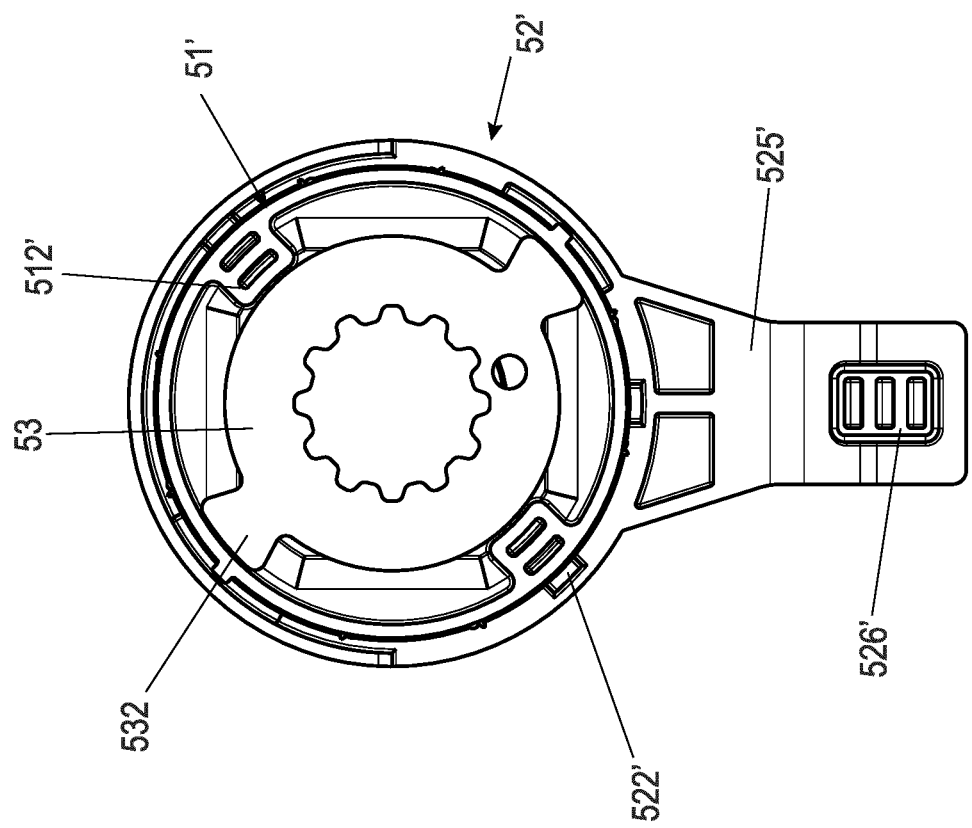
Figure 14:
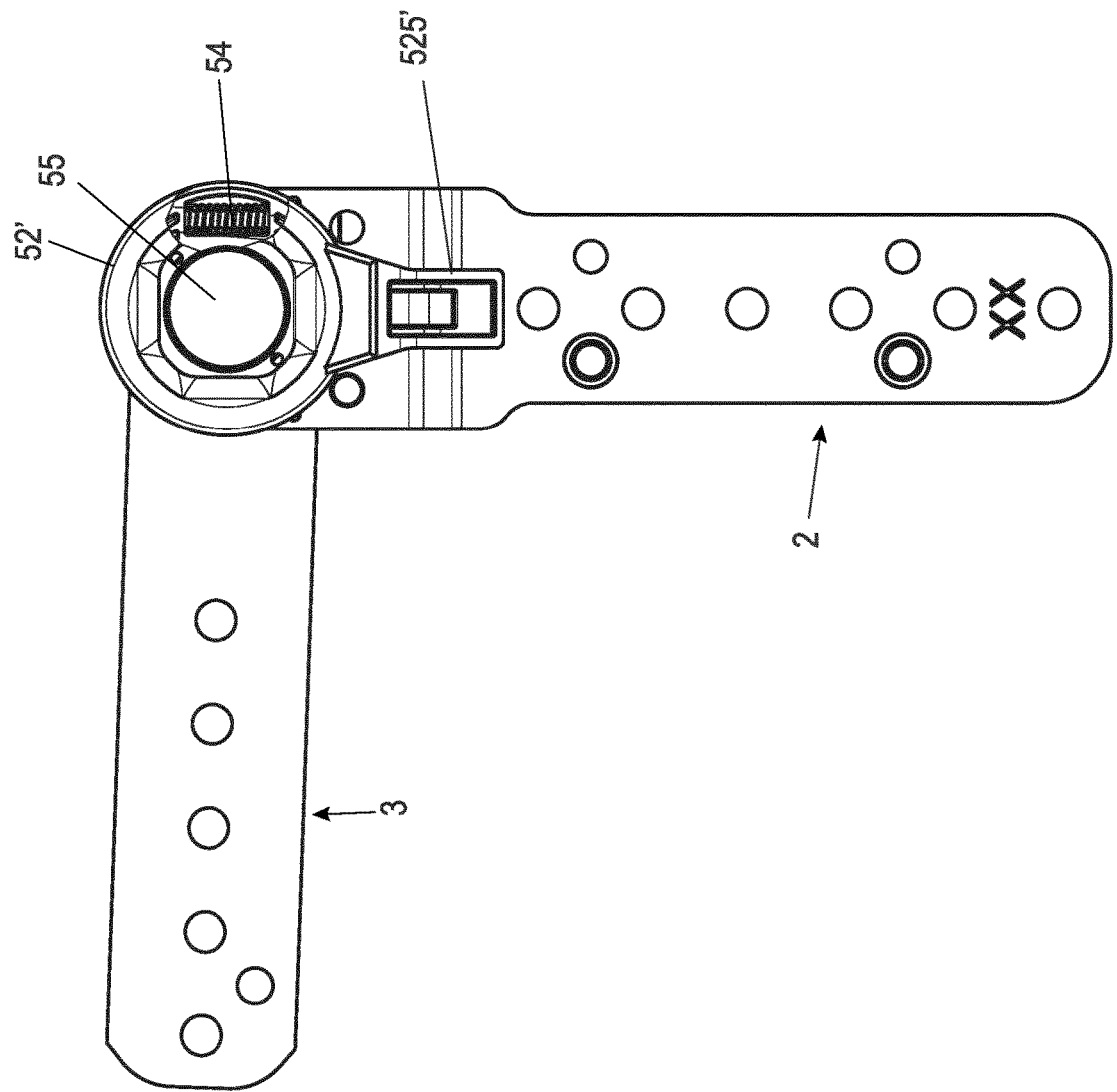
Figure 15:
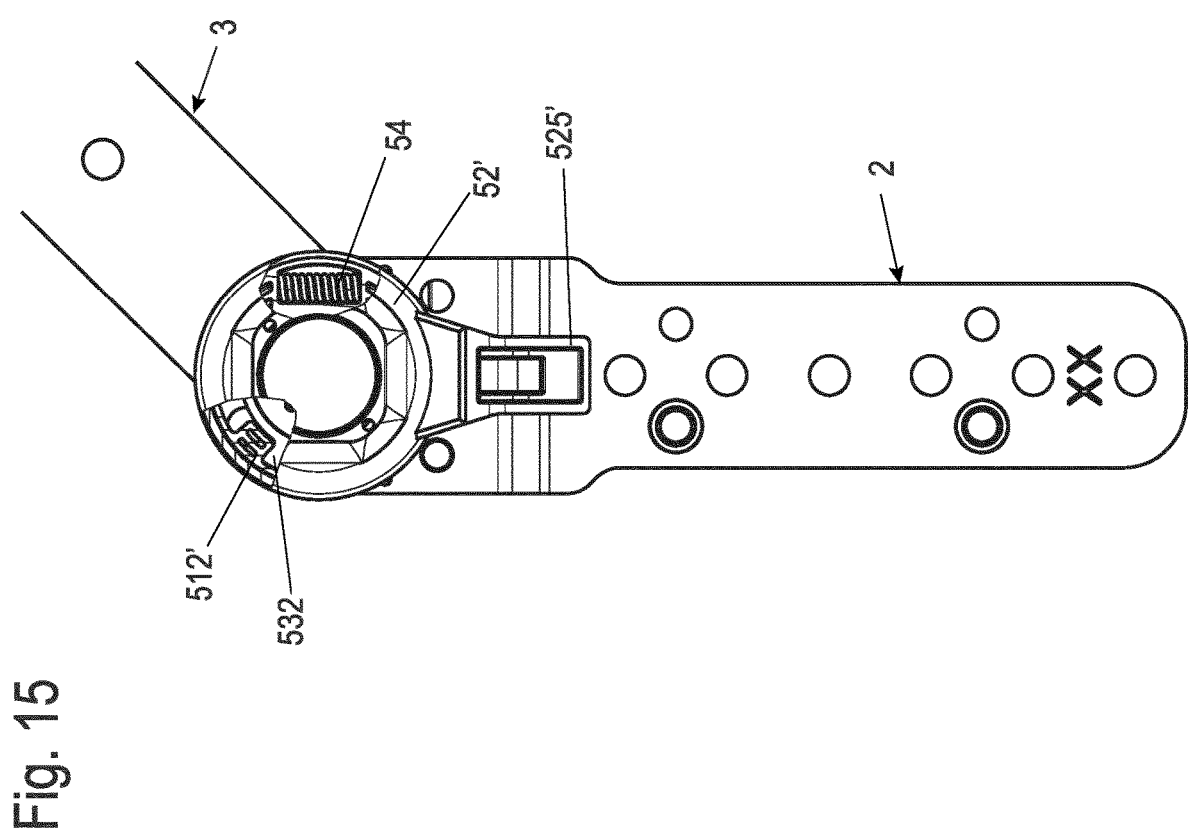
Figure 16:
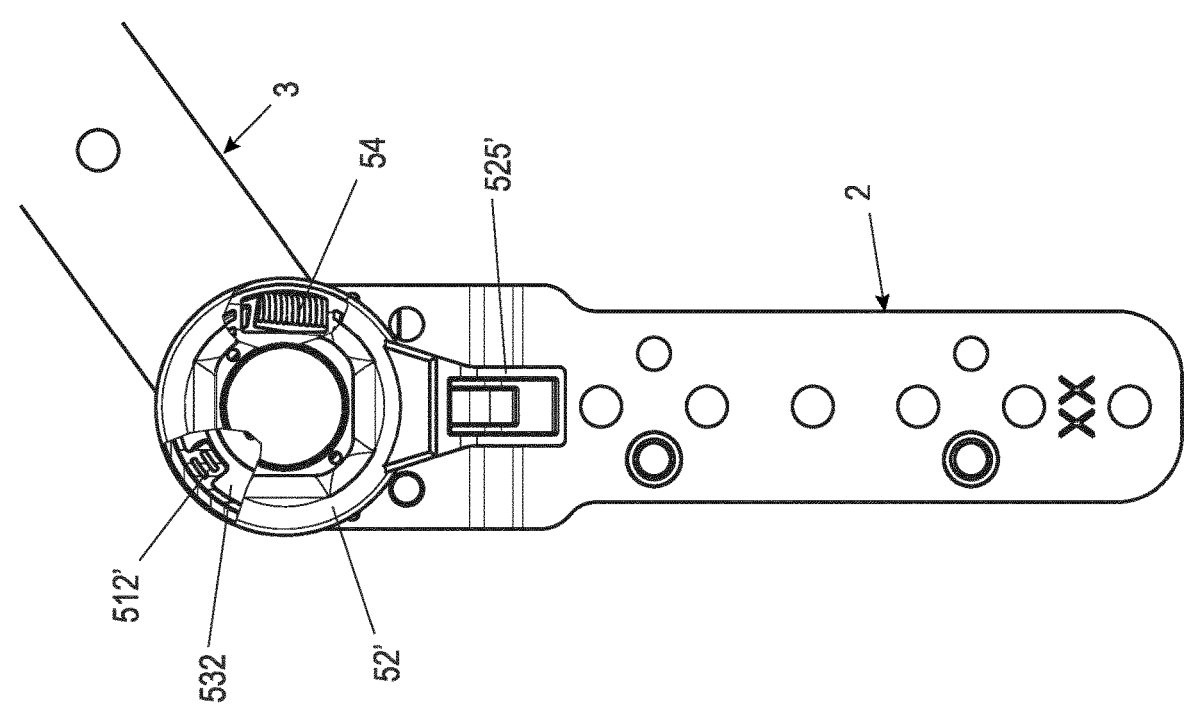
Figure 19:
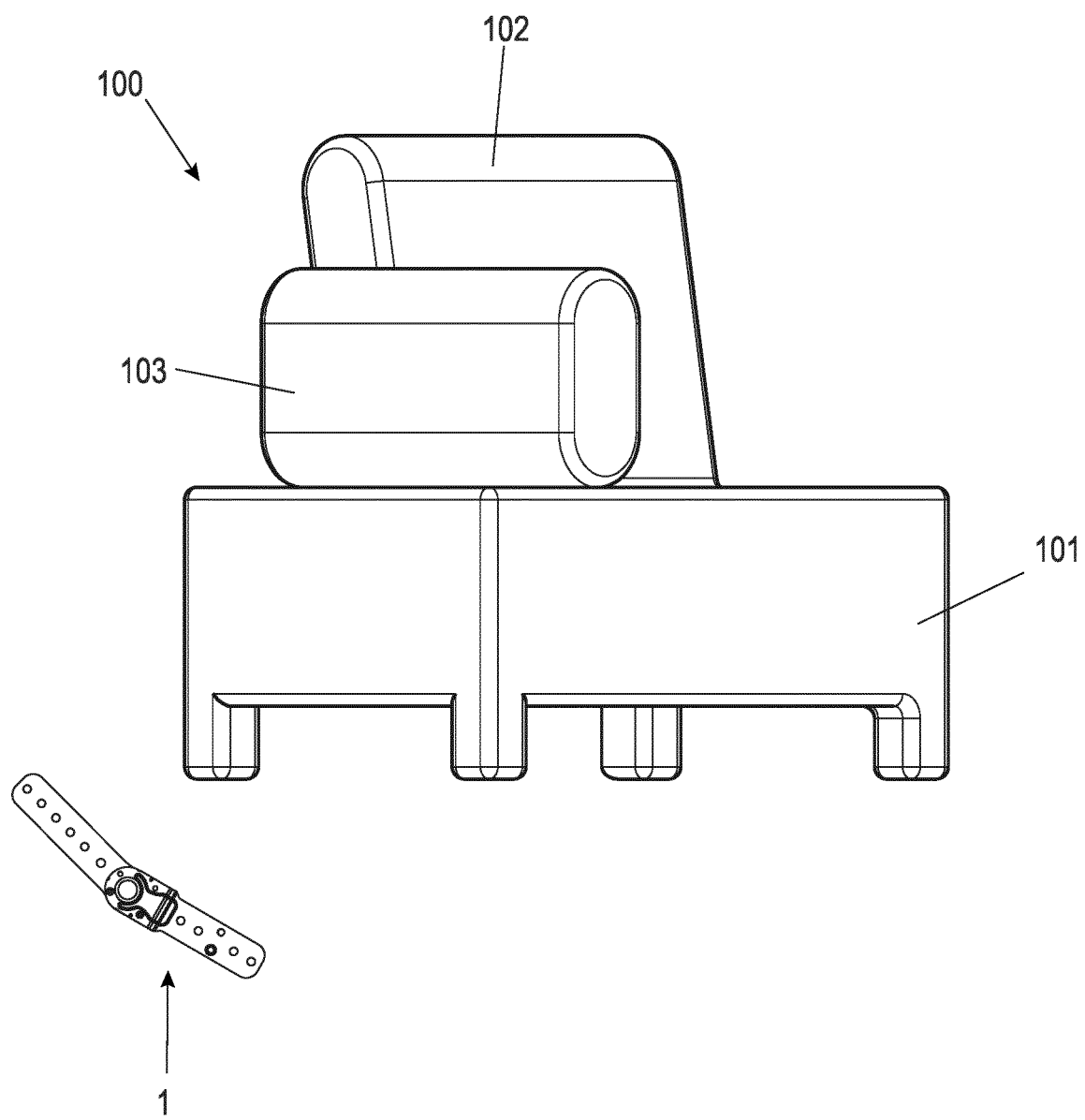

Preferred exemplary embodiments of the invention are explained in greater detail hereafter on the basis of the appended drawings. In the figures:

FIG. 1 shows a top view of an embodiment variant of a pivot fitting according to the invention in a starting position, FIG. 2 shows a perspective view of the pivot fitting from FIG. 1 having damping unit shown in an exploded illustration, FIG. 3 shows a perspective illustration of a first embodiment variant of the damping unit, FIG. 4 shows a perspective exploded illustration of the damping unit from FIG. 3, FIGS. 5 and 6 show illustrations corresponding to FIGS. 3 and 4 of a second embodiment variant of a damping unit, FIG. 7 shows a top view of the pivot fitting according to FIG. 1 having partially cutaway damping unit in a starting position of the pivot fitting, FIG. 8 shows an illustration of the pivot fitting corresponding to FIG. 7 in second lever pivoted by the predetermined adjustment angle, FIG. 9 shows a view corresponding to FIG. 7 of the pivot fitting in the switchover position, FIG. 10 shows a top view of a further embodiment variant of a pivot fitting according to the invention in a starting position, FIG. 11 shows a perspective view of the pivot fitting from FIG. 10 having damping unit shown in an exploded illustration, FIG. 12 shows a perspective illustration of a lower side of the first plate shown in FIG. 11, FIG. 13 shows a top view from below of the first plate installed in the second plate and the driver of the pivot fitting from FIG. 11, FIG. 14 shows a top view corresponding to FIG. 7 of the pivot fitting according to FIG. 10 having partially cutaway damping unit in a starting position of the pivot fitting, FIG. 15 shows an illustration of the pivot fitting corresponding to FIG. 14 in second lever pivoted by the predetermined adjustment angle, FIG. 16 shows a view corresponding to FIG. 14 of the pivot fitting in the switchover position, and FIGS. 17 to 19 show perspective illustrations of a piece of furniture having armrest in different catch positions.

DETAILED DESCRIPTION

In the following description of the figures, terms such as upper, lower, left, right, front, rear, etc. refer exclusively to the illustration and position selected by way of example in the respective figures of the pivot fitting, the lever, the catch mechanism, the force shaft, the damping unit, the plate, the driver, and the like. These terms are not to be understood as restrictive, i.e., these references can change due to different operating positions or mirror-symmetrical design or the like.

An embodiment variant of a pivot fitting according to the invention is identified as a whole with the reference sign 1 in FIGS. 1, 2, and 7 to 9.

The pivot fitting 1 comprises, as shown in FIGS. 1 and 2, a first lever 2 and a second lever 3. The two levers 2, 3 are mounted so they are pivotable in relation to one another around a common pivot axis D from a starting position shown in FIGS. 1 and 7 by a predetermined angle α.

A catch mechanism 4, using which the two levers 2, 3 can be latched in different angular positions in relation to one another within the predetermined angle α, is arranged between a first cover 22a and a second cover 22b of the first lever 2, which consists of two lever parts here.

As shown in FIGS. 17 to 19, a lever arm 21 of the first lever 2 is preferably fastened on a furniture body 101 of a piece of furniture, for example, a piece of seating or reclining furniture. A lever arm 31 of the second lever 3 is accordingly fastened on a furniture part movable in relation to the furniture body 101, for example, a backrest 102 or armrest 103 of the piece of furniture 100, and thus enables an angle adjustment of the backrest 102 or armrest 103 in relation to the furniture body 101 of the piece of furniture.

The catch mechanism 4 is constructed in this case in such a way that the two levers 2, 3 can be latched in relation to one another against a force acting in the reset direction R and are pivotable in the reset direction R when the catch mechanism 4 is deactivated.

The catch mechanism 4 is deactivatable by pivoting the second lever 3 in relation to the first lever 2 in the adjustment direction V upon reaching an end position, as shown in FIG. 9.

The catch mechanism 4 furthermore comprises a force shaft 41, which is coupled in a rotationally-fixed manner to the second lever 3.

As can furthermore be seen in FIGS. 1, 2, and 7 to 9, a damping unit 5 is arranged on the first lever 2, which is used to increase the force to be applied of the pivot movement of the second lever 3 in relation to the first lever 2 in the adjustment direction V from a predetermined adjustment angle β.

A first embodiment variant of such a damping unit 5 is shown in FIGS. 2, 5, and 6.

FIGS. 3 and 4 show an alternative embodiment variant of such a damping unit 5.

The damping unit 5 of both variants comprises a first plate 51 secured in a rotationally-fixed manner on a lever head 22 of the first lever 2 and a second plate 52 and a second plate 52, which rests on the first plate 51 and is rotatable around the pivot axis D in relation to the first plate 51.

The rotationally-fixed securing of the first plate 51 on the lever head 22 of the first lever 2 is preferably performed in this case via anchoring webs 512, which are formed on a ring-shaped main body 511 of the first plate 51, and which are inserted into respective anchoring receptacles 23 formed on surfaces of a first cover 22a of a lever head 22 of the first lever 2 facing toward the first plate 51.

The anchoring receptacles 23 can be formed inside the surface of the first cover 22a in this case, for example, stamped in. One or more such anchoring receptacles 23 can also be formed, as shown in FIG. 2, on the circumferential border of the first cover 22a of the lever head 22.

The anchoring webs 512 extend here in the axial direction from the main body 511 of the first plate 51.

Depending on the embodiment of the first plate 51 and the lever head 22 of the first lever 2, it is also conceivable to form the webs in such a way that they extend radially inward into corresponding recesses of the lever head 22. Adhesively bonding or screwing the first plate 51 on to the lever head 22 of the first lever 2 is also conceivable.

The second plate 52 is preferably axially held with the aid of a central bolt 55, which extends through central openings in the second plate 52, in the first plate 51, and the force shaft 41 and is axially fixed on the force shaft 41, on the first lever 2, and/or on the second lever 3.

A driver 53, which is coupled in a rotationally-fixed manner with the force shaft 41, which extends through the central openings of the first plate 51 and the second plate 52, is accommodated in a surface of the second plate 52 facing away from the first plate 51.

The driver 53 is mounted in this case on the second plate 52 in such a way that it is rotatable by a predetermined adjustment angle β in relation to the second plate 52.

The driver 53 is used to carry along the second plate 52 in relation to the first plate 51 from a rotation in the adjustment direction V exceeding the predetermined adjustment angle β.

For this purpose, stops 522 are formed on the second plate 52 on the surface 2 facing away from the first plate 51, having radially extending stop edges, which bear with two teeth 532 of the driver 53 formed as a ring disk 531 in an angular position of the pivot fitting 1 corresponding to the adjustment angle β. It is also conceivable to form only one such stop 522 on the second plate 52 and accordingly to form the driver having only one such tooth 532, which extends radially outward from the ring disk 531, depending on the possible angle adjustment range of the pivot fitting 1.

The rotational mounting of the first plate 51 in relation to the second plate 52 is performed by a neck ring 524, which is formed on the second plate 52 in FIGS. 2, 5, and 6, extends in the axial direction in relation to the pivot axis D, and bears on the inner border 514 of the central recess of the first plate 51.

In the embodiment variant of the damping unit 5 shown in FIGS. 3 and 4, such a ring-shaped neck 514 is formed on the first plate 51 and extends radially upward and bears in the installed state of the damping unit 5 on the inner border 524 of the second plate 52.

The pivot of the second plate 52 in relation to the first plate 51 from the predetermined adjustment angle β is made more difficult by four damping elements 54, which are mounted in a rotationally-fixed manner in receptacle pockets 513, 523 of the plates 51, 52.

The damping elements 54 are formed in the embodiment shown here as springs, in particular coiled springs.

Damping elements of other designs are also conceivable, for example, a solid elastic body or a damping cylinder, in which a rear base surface of the cylinder part bears on a radially aligned pocket wall of the first plate 51 and the end of a cylinder plunger protruding out of the cylinder part is coupled to the radially aligned wall of a receptacle pocket 523 of the second plate 52.

It is also conceivable to provide fewer than four such damping elements 54 and accordingly also a smaller number of receptacle pockets 513, 523 in the plates 51, 52.

The damping elements 54 are mounted in the receptacle pockets 513, 523 in such a way that a pivot of the plates 51, 52 in relation to one another beyond the predetermined adjustment angle β in the adjustment direction V causes a force, which counteracts the pivot and is exerted by the damping element 54.

The receptacle pockets 513, 523 are formed, as shown in FIGS. 2, 4, and 6, as half shells, which, located axially one on top of another, form a receptacle chamber for the damping elements 54 in angular positions of the pivot fitting 1 between a starting position, shown in FIG. 1, and the predetermined adjustment angle, shown in FIG. 8.

By pivoting the pivot fitting 1 between the angular position shown in FIG. 8, which corresponds to the predetermined adjustment angle β in the direction of a switchover position of the pivot fitting 1 shown in FIG. 9, the receptacle chamber for the damping elements is reduced in size by the relative displacement of the receptacle pocket 523 of the second plate 52 in relation to the receptacle pockets 513 of the first plate 52. This results in a compression of the damping elements 54, which are formed here as coiled springs, wherein the compression of the coiled springs requires an additional application of force, which is perceptible to the user of the pivot fitting 1 and thus indicates to the user the running over of the predetermined adjustment angle β of the pivot fitting 1.

The embodiment variant of the damping unit 5 shown in FIGS. 3 and 4 is suitable in particular for a production of at least one of the plates 51, 52 of the damping unit 5 from steel.

The embodiment variant of the damping unit 5 shown in FIGS. 2, 5, and 6 is suitable in particular for a damping unit 5 having plates 51, 52 manufactured from a plastic.

It is also conceivable to form one or more protruding teeth on the force shaft 41, which abut one or more protrusions on the inner border 524 of the second plate 52 after pivoting by the predetermined angle and take over the pivoting.

A further embodiment variant of a pivot fitting according to the invention is described hereafter on the basis of FIGS. 10 to 16.

In contrast to the variant described based on FIGS. 1 to 9, the second plate 52' is secured in a rotationally-fixed manner on the first lever 2 here. The second plate 52' encloses the remaining components of the damping unit 5 in this case, in particular the first plate 51', the driver 53, and the spring elements 54, wherein the central recess in the second plate 52' for accommodating the central bolt 55 is closed by a cap of the central bolt 55 in the form of a circular disk.

In this embodiment variant, the driver 53 is not arranged between the first plate 51' and the second plate 52', but rather below the first plate 51', between the first plate 51' and the first lever 2. Accordingly, the stops 512' interacting with the driver 53 upon pivoting of the levers 2, 3 in relation to one another are now formed on a lower side of the first plate 51', as shown in FIGS. 11 and 12.

For the rotationally-fixed fixation of the second plate 52' on the first lever 2, the second plate 52' additionally comprises a driver arm 524' having a driver pin 525', which is arranged, in particular formed on a lower side of the driver arm 524', and which is insertable into a pin receptacle 24 on the first lever 2 provided for this purpose.

In addition thereto, at least one anchoring web 522' for the rotationally-fixed fixation of the second plate 52' on the first lever 2 is preferably formed on the second plate 52' on a lower border of the main body 521', which anchoring web is insertable into a corresponding anchoring receptacle 23 of the first lever 2.

Furthermore, the second plate preferably comprises an apron 526', which overlaps at least a partial circumferential portion of the head 22 of the first lever 2, which once again improves the protection from penetration of dirt into the interior of the pivot fitting 1.

The damping elements 54 are accommodated in respective receptacle pockets 513', 523' of the plates 51, 52, as in the above-described embodiment variant, wherein the at least one damping element 54 is also mounted here in such a way that upon pivoting of the plates 51', 52' in relation to one another in the adjustment direction V beyond the predetermined adjustment angle β, a force acts that counteracts the pivot and is exerted by the at least one damping element 54.

The functionality of the pivot fitting shown in FIGS. 14 to 16 is performed similarly to the above-described embodiment variant of the pivot fitting 1 having the plates 51, 52.

The functionality of this embodiment variant of the pivot fitting is illustrated by FIGS. 14 to 16.

FIG. 14 shows in this case the starting position, corresponding to FIG. 7 of the above-described embodiment variant, in which the damping elements 54, of which there are four here, inserted between the first plate 51' and the second plate 52' are inserted into the receptacle pockets 513', 523' in the relaxed state.

By pivoting from this starting position into the position shown in FIG. 15, which is pivoted by the predetermined adjustment angle β, in which the driver is rotatable below the first plate 51' together with the second lever 3 without carrying along the first plate 51', the teeth 532 of the driver 53, which is also formed here as a ring disk 531, rest on the stops 512' on the lower side of the first plate 51', as is recognizable in the outline of FIG. 15.

By pivoting the pivot fitting between the angular position shown in FIG. 15 in the direction of the switchover position of the pivot fitting shown in FIG. 16 (corresponding to FIG. 9 of the above-described embodiment variant), the receptacle chamber for the damping elements 54 is also reduced in size here by the relative displacement of the receptacle pockets 513', 523', which results in a compression of the damping elements 54, which requires an additional application of force, which is perceptible to the user of the pivot fitting 1 and thus indicates to the user the running over of the predetermined adjustment angle β of the pivot fitting 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 1 pivot fitting
2 first lever
21 lever arm
22 lever head
22a first cover
22b second cover
23 anchoring receptacle
24 pin receptacle
3 second lever
31 lever arm
32 lever head
4 catch mechanism
41 force shaft
5 damping unit
51 first plate
511 main body
512 anchoring web
513 receptacle pocket
514 neck part/inner border
52 second plate
521 main body
522 stop
523 receptacle pocket
524 inner border/neck ring
51' first plate
511' main body
512' stop
513' receptacle pocket
52' second plate
521' main body
522' anchoring web
523' receptacle pocket
524' driver arm
525' driver pin
526' apron
53 driver
531 ring body/ring disk
532 stop/tooth
533 inner toothing
54 spring element/damping element
55 central bolt
100 piece of furniture
101 furniture body
102 backrest
103 armrest
D pivot axis
V adjustment direction
R reset direction
α angle
β adjustment angle

The invention claimed is:

1. A pivot fitting for movable furniture parts on pieces of furniture, the pivot fitting comprising:
 a first lever and a second lever, which are mounted so they are pivotable in relation to one another in an adjustment direction and a reset direction around a pivot axis from a base position by a predetermined angle;
 a catch mechanism, using which the two levers are latchable in relation to one another against a force acting in the reset direction in different angular positions within the predetermined angle and pivotable in the reset direction when the catch mechanism is deactivated, wherein a force shaft of the catch mechanism is coupled in a rotationally-fixed manner to the second lever, the catch mechanism is deactivatable by pivoting the second lever in relation to the first lever in the adjustment direction upon reaching a switchover position; and
 a damping unit arranged on the first lever and configured to damp a pivot movement of the second lever in relation to the first lever in the adjustment direction from a predetermined adjustment angle, and wherein the damping unit is arranged in such a way that, from the predetermined adjustment angle, the damping unit increases a required adjustment force compared to a required adjustment force prior reaching the predetermined adjustment angle.

2. The pivot fitting of claim 1, wherein the damping unit comprises a first plate, which is secured in a rotationally-fixed manner on a lever head of the first lever, a second plate, which rests on the first plate and is rotatable around the pivot axis in relation to the first plate, and at least one damping element, which is arranged between the first and second plates, is coupled to both the first and second plates, and counteracts a rotational movement of the second plate in relation to the first plate in the adjustment direction.

3. The pivot fitting of claim 2, wherein the damping unit comprises a driver, which is rotatable in relation to the first plate by the predetermined adjustment angle and is coupled in a rotationally-fixed manner to the force shaft.

4. The pivot fitting of claim 3, wherein at least one stop is formed on the second plate and the driver is a ring disk enclosing the force shaft having at least one tooth extending radially outward, which bears on the stop in an angular position of the pivot fitting corresponding to the adjustment angle.

5. The pivot fitting of claim 3, wherein at least one anchoring web, which is inserted into an anchoring receptacle of the first lever, for rotationally-fixed fixing of the second plate on the first lever is formed on the second plate.

6. The pivot fitting of claim 3, wherein the second plate is a cover covering the first plate.

7. The pivot fitting of claim 3, wherein the second plate comprises a driver arm having a driver pin for rotationally-fixed fixing of the second plate on the first lever.

8. The pivot fitting of claim 2, wherein at least one receptacle pocket for the rotationally-fixed mounting of the at least one damping element is formed in the first and second plates, wherein the at least one damping element is mounted in such a way that a pivot of the first and second plates in relation to one another in the adjustment direction beyond the predetermined adjustment angle causes a force, which counteracts the pivot and is exerted by the at least one damping element.

9. The pivot fitting of claim 8, wherein at least one receptacle pocket, which is a half shell, is formed on each of the first and second plates, wherein the half shells of the first and second plates, in angular positions of the pivot fitting between a starting position and the predetermined adjustment angle, form a receptacle chamber for the damping element while located one on top of another, wherein the receptacle chamber is reduced in size by pivoting the pivot fitting in the adjustment direction from the angular positions corresponding to the predetermined adjustment angle in a direction of a switchover position of the pivot fitting by relative displacement of the at least one receptacle pocket of the second plate in relation to the at least one receptacle pocket of the first plate.

10. The pivot fitting of claim 2, wherein the at least one damping element is a coiled spring.

11. The pivot fitting of claim 2, wherein at least one anchoring web, which is inserted into an anchoring receptacle of the first lever, for rotationally-fixed fixing of the first plate on the first lever is formed on the first plate.

12. The pivot fitting of claim 2, wherein the damping unit comprises a central bolt, using which the damping unit is fixed on the first lever and/or on the second lever axially in relation to the pivot axis.

13. The pivot fitting of claim 2, wherein at least the first and second plates are plastic components or steel components.

14. The pivot fitting of claim 1, wherein the damping unit comprises a first plate rotatable around the pivot axis on a lever head of the first lever, a second plate, which rests on the first plate and is secured in a rotationally-fixed manner on the first lever, and at least one damping element, which is arranged between the plates, coupled to both plates, and which counteracts a rotational movement of the second plate in relation to the first plate in the adjustment direction.

15. The pivot fitting of claim 14, wherein the damping unit comprises a driver, which is rotatable in relation to the first plate by the predetermined adjustment angle and is coupled in a rotationally-fixed manner to the force shaft.

16. The pivot fitting of claim 15, wherein at least one stop is formed on the first plate and the driver is a ring disk enclosing the force shaft having at least one tooth extending radially outward, which bears on the stop in an angular position of the pivot fitting corresponding to the adjustment angle.

17. A piece of furniture, comprising:
a first furniture part;
a second furniture part; and
a pivot fitting coupled to the first and second furniture parts, the pivot fitting comprising
a first lever and a second lever, which are mounted so they are pivotable in relation to one another in an adjustment direction and a reset direction around a pivot axis from a base position by a predetermined angle;
a catch mechanism, using which the two levers are latchable in relation to one another against a force acting in the reset direction in different angular positions within the predetermined angle and pivotable in the reset direction when the catch mechanism is deactivated, wherein a force shaft of the catch mechanism is coupled in a rotationally-fixed manner to the second lever, the catch mechanism is deactivatable by pivoting the second lever in relation to the first lever in the adjustment direction upon reaching a switchover position; and
a damping unit arranged on the first lever configured to damp a pivot movement of the second lever in relation to the first lever in the adjustment direction from a predetermined adjustment angle, and wherein the damping unit is arranged in such a way that, from the predetermined adjustment angle, the damping unit increases a required adjustment force compared to a required adjustment force prior reaching the predetermined adjustment angle.

18. The piece of furniture of claim 17, wherein the first furniture part is furniture body and the second furniture part is an armrest or other adjustable furniture part, and wherein the pivot fitting adjustably fixes the second furniture part.

* * * * *